E. STORM.

BOTTLE.

No. 10,969. Reissued Nov. 27, 1888.

Witnesses.
Geo. Wadman.
M. J. Roach.

Inventor.
Edward Storm.
By his attorneys
Gifford H Brown

N. PETERS, Photo-Lithographer, Washington, D. C.

UNITED STATES PATENT OFFICE.

EDWARD STORM, OF POUGHKEEPSIE, NEW YORK.

BOTTLE.

SPECIFICATION forming part of Reissued Letters Patent No. 10,969, dated November 27, 1888.

Original No. 379,615, dated March 20, 1888. Application for reissue filed September 13, 1888. Serial No. 285,340.

*To all whom it may concern:*

Be it known that I, EDWARD STORM, of Poughkeepsie, Dutchess county, and State of New York, have invented a certain new and useful Improvement in Bottles, of which the following is a specification.

The object of my improvement is to produce a bottle, of glass or analogous material, which may be easily packed for transportation without danger of breakage.

I will describe in detail a bottle embodying my improvement, and then point out the novel features in the claim.

Figure 1:
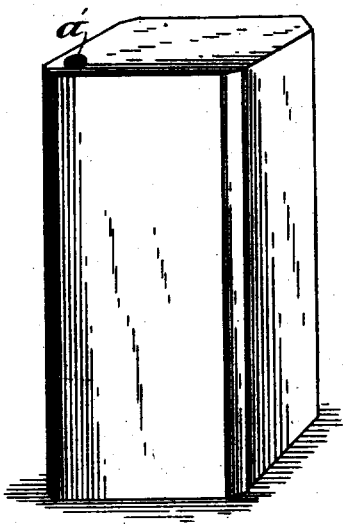
Figure 2:
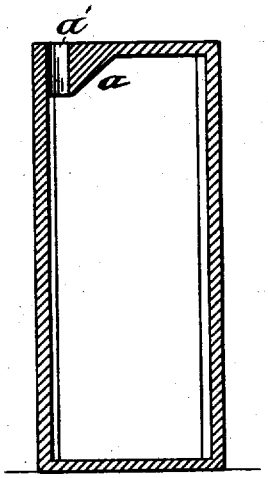
Figure 3:
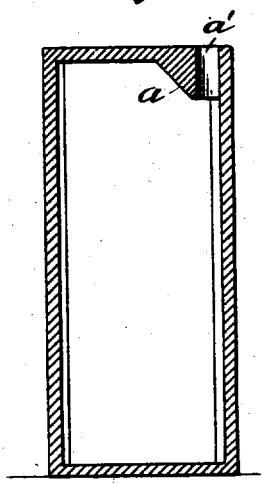

In the accompanying drawings, Figure 1 is a perspective view of a bottle embodying my improvement. Fig. 2 is a vertical section of the same while occupying an upright position. Fig. 3 is a similar section, except that it is taken in a plane at right angles to that section represented by Fig. 2.

Similar letters of reference designate corresponding parts in all the figures.

The bottle in the present example of my invention is of rectangular form, having a flat top and bottom and flat sides, with the corners chamfered off. This is a very advantageous form, because a number of bottles so shaped may be packed without much waste of space. It is not, however, essential to my invention.

The bottle has an inverted or inwardly-extending neck, *a*. This is formed by thickening the glass or analogous material of which the bottle is made from the upper end downwardly within the interior. As shown, this is done at a corner or salient portion, and it is most advantageous to do it at that portion of the bottle. In this thickened portion of the top of the bottle is a cavity or opening, *a'*, extending lengthwise of the bottle. The thickened material in which this cavity or opening is formed is inclined or gradually decreased toward the main portion of the top of the bottle, so as not to form any abrupt corners around it wherein liquid might lodge.

The cavity or opening *a'* may be closed by an ordinary cork.

By tilting the bottle into various positions, so as to cause the liquid contents to flow into that portion which is opposite the inner end of the cavity or opening, all the liquid may be poured from the bottle.

What I claim as my invention, and desire to secure by Letters Patent, is—

A bottle having salient portions and an approximately flat top, a portion of the top at one salient portion thickened internally and being inclined toward the main portion of the top of the bottle, and having an aperture extending through it opening upon the top of the bottle, substantially as specified.

EDWARD STORM.

Witnesses:
C. B. HERRICK,
H. E. LOSEY.